(12) United States Patent
Richardson

(10) Patent No.: US 10,402,895 B2
(45) Date of Patent: *Sep. 3, 2019

(54) COMPUTER-ASSISTED SHOPPING AND PRODUCT LOCATION

(71) Applicant: Hand Held Products, Inc., Fort Mill, SC (US)

(72) Inventor: Neil Richardson, San Jose, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,357

(22) Filed: Aug. 18, 2017

(65) Prior Publication Data

US 2017/0345086 A1 Nov. 30, 2017

Related U.S. Application Data

(63) Continuation of application No. 13/759,628, filed on Feb. 5, 2013, now Pat. No. 9,741,071.

(60) Provisional application No. 61/723,528, filed on Nov. 7, 2012.

(51) Int. Cl.
G06Q 30/00 (2012.01)
G06Q 30/06 (2012.01)

(52) U.S. Cl.
CPC .................. *G06Q 30/0639* (2013.01)

(58) Field of Classification Search
CPC .............................................. G06Q 30/06–08
USPC ................................................ 705/26.1–27.2
See application file for complete search history.

(56) References Cited

U.S. PATENT DOCUMENTS

| 7,599,855 B2 | 10/2009 | Sussman |
| 9,741,071 B2* | 8/2017 | Richardson ........ G06Q 30/0639 |
| 2007/0078558 A1 | 4/2007 | Glynn |
| 2008/0005168 A1 | 1/2008 | Huff et al. |
| 2008/0074264 A1 | 3/2008 | Sharpe et al. |
| 2009/0012704 A1 | 1/2009 | Franco et al. |

(Continued)

OTHER PUBLICATIONS

Grocery iQ: Grocery Shopping Made Simple, downloadable from http://www.groceryiq.com, 1 page, downloaded on Jul. 2, 2012. Previously provided in Parent Application.

(Continued)

*Primary Examiner* — Ethan D Civan
(74) *Attorney, Agent, or Firm* — Additon, Higgins & Pendleton, P.A.

(57) ABSTRACT

In general, techniques are described that enable crowdsourcing of product-related information. Product-related information may include availability and intra-store locations of various products at particular stores. An example system includes an interface, a memory, and one or more programmable processors configured to receive, at the interface an intra-store product location from a first client device, the intra-store product location indicating a location of a product within a store. The programmable processor(s) are further configured to store, to at least one storage device coupled to the system and in association with the product, the received intra-store product location, receive, at the interface, a request associated with the product from a second client device, and send, from the interface, the intra-store product location to the second client device in response to receiving the request associated with the product.

18 Claims, 5 Drawing Sheets

(56) References Cited

U.S. PATENT DOCUMENTS

| | | |
|---|---|---|
| 2009/0112683 A1* | 4/2009 | Hamilton, II .......... G06Q 30/02 |
| | | 705/7.32 |
| 2010/0030578 A1* | 2/2010 | Siddique ............ G06Q 10/0637 |
| | | 705/3 |
| 2010/0114957 A1 | 5/2010 | Benson et al. |
| 2012/0101876 A1 | 4/2012 | Turvey et al. |
| 2014/0095273 A1 | 4/2014 | Tang et al. |

OTHER PUBLICATIONS

Grocery Gadget—Shopping List, 2 pages, downloadable from https://itunes.apple.com/us/app/grocery-gadget-shopping-list/id287932487?mt=8, downloaded on Jul. 2, 2012. Previously provided in Parent Application.

Skript—Sync Shopping Lists with Family via Cloud, 2 pages, downloadable from https://itunes.apple.com/us/app/d491322606, downloaded on Jul. 2, 2012. Previously provided in Parent Application.

Free Iphone & Android Ziplist Apps—Shared Family Lists & Barcodes, 1 page, downloadable from http://get.ziplist.com, downloaded on Jul. 2, 2012. Previously provided in Parent Application.

Mobile App to Provide In-Store Product Location, Such as Aisle Number, 4 pages, downloadable from http://www.aislefinder.com, downloaded on Jul. 2, 2012. Previously provided in Parent Application.

Mobile App Provides Product Location Within Store, 1 page, downloadable from http://corporate.walmart.com, downloaded on Jul. 2, 2012. Previously provided in Parent Application.

\* cited by examiner

COMPUTER-ASSISTED SHOPPING AND PRODUCT LOCATION

CROSS-REFERENCE TO RELATED APPLICATIONS

The present application claims the benefit of U.S. patent application Ser. No. 13/759,628 for Computer-Assisted Shopping and Product Location filed Feb. 5, 2013 (and published May 8, 2014 as U.S. Patent Publication No. 2014/0129378), now U.S. Pat. No. 9,741,071, which claims the benefit of U.S. Provisional Application No. 61/723,528 for Computer-Assisted Shopping and Product Location filed Nov. 7, 2012. Each of the foregoing patent applications, patent publication, and patent is hereby incorporated by reference in its entirety.

TECHNICAL FIELD

The present disclosure generally relates to the collection and collaborative use of product data.

BACKGROUND

Consumers purchase various products via retail stores. More specifically, retail stores represent the final point of sale ("POS") before an end-user gains possession of a product. To this end, retail stores often stock and sell a wide variety of products, thus catering to broad customer demands.

Often, multiple consumers, such as members of a single family, may pool their consumer needs together, in order to more efficiently fill those needs. In turn, pooling consumer needs in this manner can result in a single shopper attempting to fill diverse consumer needs during a single visit to a retail store.

SUMMARY

In general, techniques of this disclosure are directed to sharing, or "crowdsourcing" product information pertaining to various products available through retail store locations. In various implementations, the techniques enable a shopping assistant system to collect and catalog information pertaining to the availability of products at various retail store locations. In some implementations, the techniques enable the shopping assistant system to gather intra-store location information for a product (e.g., aisle numbers, shelving levels, etc.).

The techniques of this disclosure may also enable one or more computing devices to collect, aggregate, and transmit shopping list information. For instance, a server implementing the techniques may receive, from various client devices, designations of products that users of the client devices intend to purchase. In turn, the server is configured or otherwise operable to update a shopping list, and provide the updated shopping list, in real-time, to users of the various client devices. The techniques of this disclosure may be implemented in systems that include various computing devices, such as servers and multiple client devices. Additionally, the techniques may incorporate such functionalities as barcode reading and data synchronization through so-called "cloud computing."

In one example, a method includes receiving, by one or more processors, an intra-store product location from a first client device, the intra-store product location indicating a location of a product within a store and storing, by the one or more processors to at least one storage device and in association with the product, the received intra-store product location. The method further includes receiving, by the one or more processors, a request associated with the product from a second client device, and sending, by the one or more processors, the intra-store product location to the second client device in response to receiving the request associated with the product.

In another example, a shopping assistant system includes an interface, a memory, and one or more programmable processors. The programmable processor(s) are configured to receive, at the interface, an intra-store product location from a first client device, the intra-store product location indicating a location of a product within a store, and store, to at least one storage device coupled to the shopping assistant system, the received intra-store product location. The programmable processor(s) are further configured to receive, at the interface, a request associated with the product from a second client device, and send, from the interface, the intra-store product location to the second client device in response to receiving the request associated with the product.

In another example, a computer-readable storage device is encoded with instructions. The instructions, when executed, cause one or more programmable processors of a computing device to perform operations. The operations include receiving an intra-store product location from a first client device, the intra-store product location indicating a location of a product within a store and storing, to a storage device and in association with the product, the received intra-store product location. The operations further include receiving a request associated with the product from a second client device, and sending the intra-store product location to the second client device.

In another example, a method includes sending, by a client device to a shopping assistant system, a request associated with a product, receiving, by the client device from the shopping assistant system in response to the request, availability information and information indicating whether an intra-store product location is available for the product at a store, and sending, by the client device to the shopping assistant system in response to receiving the information indicating whether an intra-store product location is available, an updated intra-store product location, the updated intra-store product location for the product.

In another example, a client device includes an interface, a memory, and one or more programmable processors. The programmable processor(s) are configured to send, from the interface to a shopping assistant system, a request associated with a product, receive, at the interface from the shopping assistant system in response to the request, availability information and information indicating whether an intra-store product location is available for the product at a store, and send, from the interface to the shopping assistant system in response to receiving the information indicating whether an intra-store product location is available, an updated intra-store product location, the updated intra-store product location for the product.

The techniques of this disclosure provide one or more potential advantages. As one example, when implemented across a server-client network architecture, the techniques may enable consumers to more efficiently locate products within a retail store location, which otherwise may be a time-consuming process. As another example, systems implementing the techniques are updated dynamically, through the collection and processing of data from various consumers who patronize the retail store locations. By collecting and processing data in real-time, the systems are able to crowdsource voluminous data and present consumers with accurate, up-to-date product location information.

Additionally, by consolidating shopping list information received from various sources and distributing the consolidated shopping list information, the techniques enable users of multiple client devices to collaborate in updating the shopping list and access information that is updated in real-time. For instance, a user who is at or nearing a store location may use a mobile computing device, such as a mobile phone, to view a shopping list that was recently updated by a family member, from a home location, to include additional items for purchase. As another potential advantage, the techniques may enable users to update the shopping list (e.g., populate or depopulate items) by using various computing devices to scan barcodes, RFID tags, universal product codes (UPCs), and other information affixed to the items, using devices such as mobile phones and tablet computers that may be equipped with or coupled to image capture devices, such as cameras.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
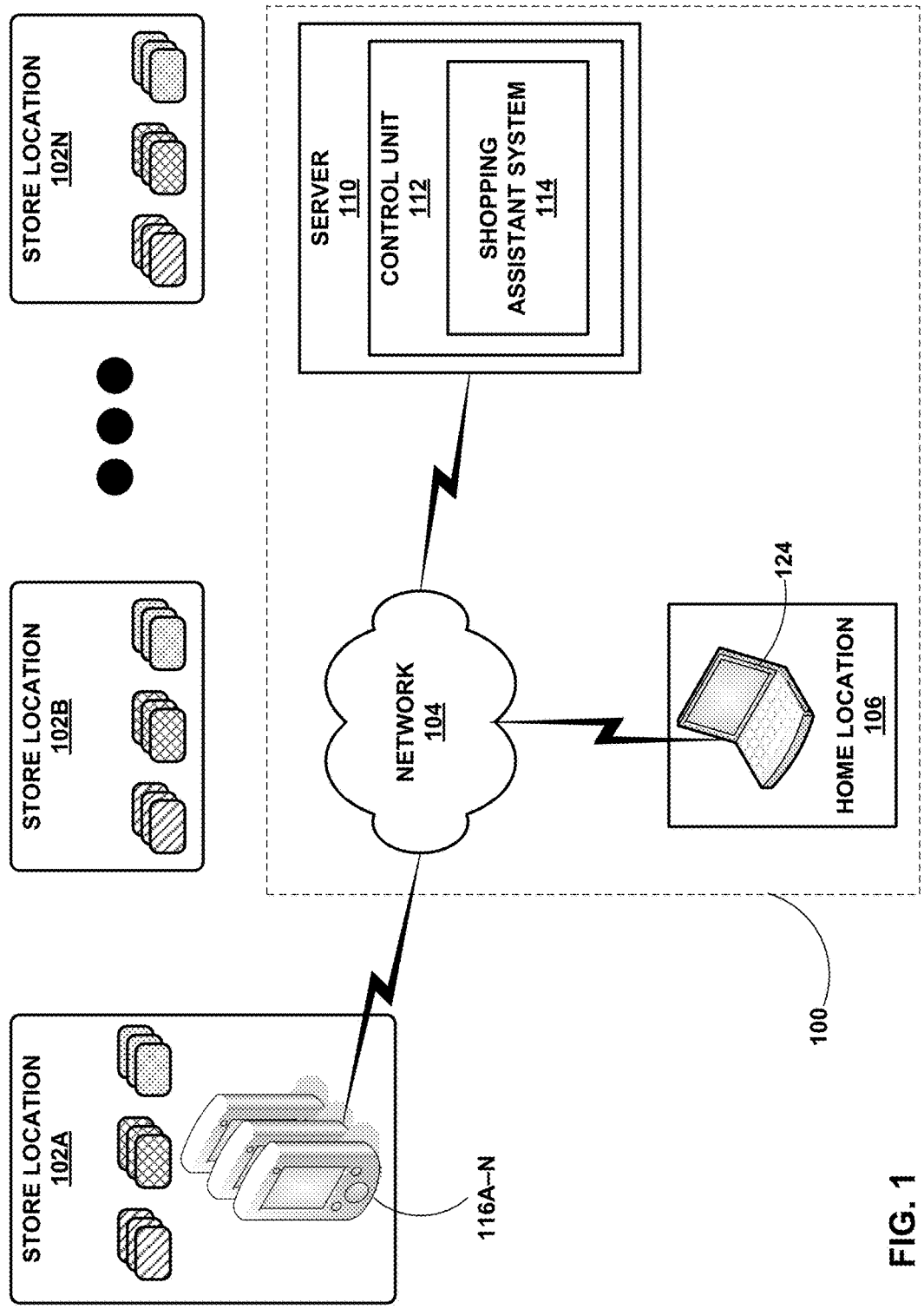
FIG. 1 is a conceptual diagram illustrating an example system in which one or more computing devices may implement shopping assistance techniques, in accordance with various aspects of this disclosure.

FIG. 1 is a conceptual diagram illustrating an example system 100 in which one or more computing devices may implement shopping assistance techniques, in accordance with various aspects of this disclosure. In the example of system 100, a server 110 is communicatively coupled to various devices over network 104. Although in the specific example of FIG. 1, server 110 is illustrated as being communicatively coupled to a specific set of computing devices, namely mobile devices 116A-116N ("mobile devices 116") and computing device 124 (in this case a personal computer, e.g., a laptop computer at home location 106), it will be appreciated that server 110 may communicate with any number of computing devices (of various types) over network 104 in implementing the techniques of this disclosure. While server 110 is illustrated in FIG. 1 as a single device for ease of illustration purposes only, it will be appreciated that in various implementations, server 110 may include a number of devices, such as processing units, network interfaces, and storage devices. Additionally, various computing resources and functionalities provided by server 110 may be co-located and/or distributed across different locations.

Additionally, FIG. 1 illustrates various store locations 102A-102N ("store locations 102"). Each of store locations 102 represents a distinct point-of-sale ("POS") location, where consumers can purchase one or more items. Based on a specific store entity associated with each of store locations 102, each respective location of store locations 102 may offer different products (or ranges of products) for sale. For example, if store location 102A is a department store, then store location 102 is likely to offer a broad range of products for sale. Conversely, if store location 102B is a specialty store, then store location 102B is likely to offer a narrower selection of products, but a greater variety of each available type of product. As a result, a consumer may be able to fill varying purchasing needs at each of store locations 102.

Mobile devices 116 may each include, be, or be part of various types of devices, such as a mobile phone (including so-called "smartphones"), a personal digital assistant ("PDA"), or a tablet computer. Mobile devices 116 may provide a user interface (UI), e.g., a display, input media, and a graphical user interface (GUI), by which a consumer may interact with the mobile device. In some examples, a consumer may input or view product information via the user interface provided by the mobile device. In various implementations, one or more of mobile devices 116 are configured or otherwise operable to capture and interpret various types of machine-readable codes, such as barcodes, universal product codes (UPCs), electronic product codes (EPCs) as provided by radio frequency identification (RFID), or quick response (QR) code. For example, in implementations where one or more of mobile devices 116 is equipped with a camera, those particular devices of mobile devices 116 may use the respective cameras to capture a UPC affixed to a product. The mobile device may match the captured UPC or other code to a product identification, e.g., using product tracking software installed on or otherwise accessible (via server 110, for example) to one or more of mobile devices 116.

While all of mobile devices 116 are illustrated in FIG. 1 as being at store location 102A for ease of illustration purposes only, it will be appreciated that various devices of mobile devices 116 may be at store location 102A at different times. For instance, mobile device 116A may, at a given point of time, be the only device of mobile devices 116 that is at store location 102A. At a subsequent point of time, mobile device 116B may be the only device of mobile devices 116 that is at store location 102A.

Computing device 124 at home location 106 may be any type of computing device. Computing device 124 may take the form of a laptop or other personal computer at home location, although computing device may be a mobile device that is located at home location 106 or otherwise not within a store location 102. Computing device 124 may include a UI, which may include a display, input media, and a GUI. A consumer, e.g., at home location 106, may enter and view product information, e.g., a product description, via the UI provided by computing device 124. As shown in FIG. 1, server 110 includes control unit 112. Control unit 112, in various examples, includes any combination of one or more processors, one or more field programmable gate arrays (FPGAs), one or more application specific integrated circuits (ASICs), and one or more application specific standard products (ASSPs). Control unit 112 may also comprise memory, both static (e.g., hard drives or magnetic drives, optical drives, FLASH memory, EPROM, EEPROM, etc.)

and dynamic (e.g., RAM, DRAM, SRAM, etc.), or any other non-transitory computer readable storage medium capable of storing instructions that cause the one or more processors to perform the techniques described in this disclosure. Thus, control unit 112 may represent hardware or a combination of hardware and software to support the below described components, modules or elements, and the techniques should not be strictly limited to any particular example described below. Additionally, in various examples, functionalities described with respect to server 110 and/or shopping assistant system 114 may be implemented by control unit 112 or components thereof, such as by one or more processors of server 110.

As shown, control unit 112 provides shopping assistant system 114. Shopping assistant system 114 is configured or otherwise operable to implement various techniques described herein. In some implementations, shopping assistant system 114 is operable to receive product-identifying information from one or both of mobile devices 116 and computing device 124 to populate and/or depopulate a shopping list. Additionally, in some implementations, shopping assistant system 114 is operable to sync shopping list information, such that the shopping list is available a number of users using various devices, such as to users of both mobile devices 116 and computing device 124.

Groups of consumers, such as members of a family or other organization, may share, update, and monitor purchasing needs according to one or more techniques of this disclosure using devices such as computing device 124 and mobile devices 116. By entering product-identifying information at one or more of mobile devices 116 and/or computing device 124, the consumers of the group are able to collectively document future purchasing needs, or that certain needed items have been purchased. As one example, the consumers may use shopping list software accessible to mobile device 116A and/or computing device 124 to add and remove items for purchase. In one implementation, mobile device 116A and computing device 124 may access and utilize shopping list software provided by server 110.

For example, shopping assistant system 114 may receive product-identifying information from computing device 124 (which is at home location 106) to populate the shopping list. Independent of the populating operation, shopping assistant system 114 may receive product-identifying information from mobile device 116A to depopulate the shopping list. More specifically, a user of computing device 124 may add an item to be purchased, while a user of mobile device 116A removes an item from the list (e.g., by scanning the UPC of an item recently selected for purchase at store location 102A). In turn, shopping assistant system 114 dynamically updates the shopping list, providing real-time shopping list information to users of mobile device 116A and computing device 124. In this manner, shopping assistant system 114 is operable to consolidate purchasing information across multiple users and provide the users with a consolidated, up-to-date shopping list.

In some scenarios, the user of a mobile device 116 may encounter difficulties in locating a particular product within store location 102A. As described, depending on the size, layout, and other characteristics of store location 102A, a user may expend substantial time and energy to discern the intra-store location (e.g., aisle and/or shelf number) of a particular product within store location 102A. In various implementations, shopping assistant system 114 is operable to collect, store, and modify intra-store location information of particular items.

For instance, if the user of mobile device 116A locates a particular product and scans the UPC code, shopping assistant system 114 is operable to discern the intra-store location of the scanned product. Shopping assistant system 114 may discern the intra-store location using a variety of data, such as GPS coordinates transmitted by mobile device 116A, triangulation information associated with wireless access points deployed at store location 102A, or ZigBee® network information available at store location 102A. In some examples, e.g., if shopping assistant system 114 is not otherwise able to access to the intra-store location of a scanned product, shopping assistant system 114 causes mobile device 116A to prompt the user to enter the intra-store location. In some examples, shopping assistant system 114 causes mobile device 116A to prompt a user to enter an aisle number, a shelf number, and other related information with regards to the scanned product. In turn, shopping assistant system 114 is configured to save the intra-store location of the scanned product, either locally at server 110, or at a remote location accessible to server 110 (e.g., through cloud-computing methods). In some implementations, mobile device 116A is configured to locally store, or cache, the intra-store location of one or more scanned products. For instance, mobile device 116A may store the intra-store location(s) to one or more storage device included in mobile device 116A. By caching the intra-store location of various products (such as frequently purchased products), mobile device 116A may provide convenient access to the intra-store locations. For instance, a user's access to a product's intra-store location may not be encumbered by unreliability of a network connection over which mobile device 116A communicates with shopping assistant system 114.

Additionally, shopping assistant system 114 may provide enhanced product information as part of the consolidated shopping list through inclusion of intra-store locations of various products in the list. For example, if another consumer adds a particular product to a shopping list, shopping assistant system 114 may draw on the previously acquired intra-store location of the product to assist the consumer. For example, shopping assistant system 114 may provide the intra-store location of the product to the consumer responsive to an indication that the user is at store location 102A. Shopping assistant system 114 may determine that the consumer is at store location 102A based on various data, such as GPS coordinates transmitted from the consumer's mobile computing device, a wireless network identifier detected by the mobile computing device, and the like.

Similarly, shopping assistant system 114 may continue to receive updates and/or clarifications on intra-store location information of a product. For example, a subsequent scan of a product using mobile device 116B may indicate a different intra-store location from the currently saved intra-store location information. In this scenario, shopping assistant system 114 is operable to update the intra-store location based on the updated information received from mobile device 116B. As another example, shopping assistant system 114 may have partial information associated with the intra-store location of a product (e.g., the aisle number, but not the shelf number). In this example, shopping assistant system 114 is operable to complete the available intra-store location information based on data subsequently received from mobile device 116B or another device at store location 102A. In this manner, shopping assistant system 114 implements the techniques of this disclosure to aggregate (or "crowdsource") information provided by various users and/or devices for the benefit of users during future visits to a particular store location.

Figure 2:
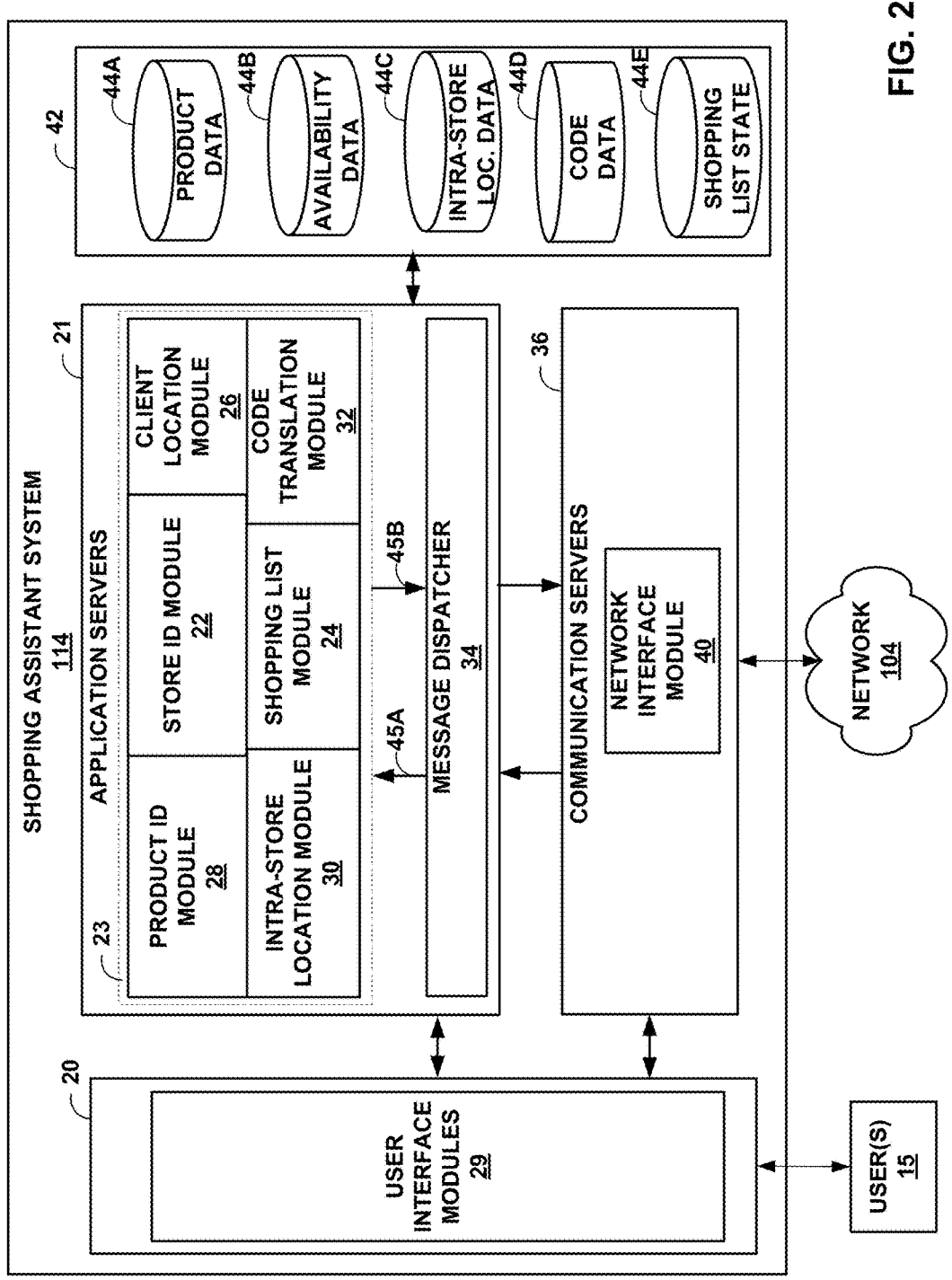
FIG. 2 is a block diagram illustrating further details of one example implementation of the shopping assistant system illustrated in FIG. 1

FIG. 2 is a block diagram illustrating further details of one example implementation of shopping assistant system 114 illustrated in FIG. 1. In general, shopping assistant system 114 includes one or more computing devices (e.g., computing servers that provide operating environments for various software modules). These servers can generally be categorized as web servers 20, application servers 21, communication servers 36, and database servers 42. Although these servers are illustrated separately in FIG. 2, shopping assistant system 114 may, in various implementations, be realized by a single computing device, or a plurality of cooperating computing devices, as the case may be.

Web servers 20 provide an interface by which one or more authorized users 15, e.g., consumers, communicate with shopping assistant system 114 via network 104. In one configuration, web servers 20 execute web server software (such as software marketed by Microsoft® Corporation under the trade designation "INTERNET INFORMATION SERVICES" or formerly under the trade designation "INTERNET INFORMATION SERVER"). As such, web servers 20 provide an environment for interacting with remote user(s) 15 according to user interface modules 29, which can include Active Server Pages, web pages written in hypertext markup language (HTML) or dynamic HTML, Active X modules, Lotus scripts, Java scripts, Java Applets, Distributed Component Object Modules (DCOM) and the like.

Although illustrated as "server side" software modules executing within an operating environment provided by web server 20, user interface modules 29 could readily be implemented as "client-side" software modules executing on computing devices, such as mobile devices 116 and computing device 124 of FIG. 1, used by one or more remote users. User interface modules 29 could, for example, be implemented as Active X modules executed by a web browser for execution on the remote computing devices.

Communication servers 36 provide an operating environment for various interfaces and/or modules that provide the ability to establish direct connections with one or more remote devices (such as mobile devices 116 and computing device 124) and/or disparate data systems of various enterprises (such as store locations 102, suppliers). In this manner, shopping assistant system 114 can automatically interact with mobile devices 116 and/or systems deployed at various locations, such as store locations 102. As shown in FIG. 2, network interface module 40, while operating within an environment provided by communication servers 36, may enable shopping assistant system 114 to communicate over network 104, e.g., with mobile devices 116 and computing device 124.

Application servers 21 provide an operating environment for application software modules 23, which provide the underlying logic and functionality for implementing the various techniques ascribed to shopping assistant system 114 herein. Message dispatcher 34 receives communications from communication servers 36, and issues inbound messages 45A to application software modules 23 to process the communications. In particular, communication servers 36 may receive, using network interface module 40, communications from remote devices, and, in turn, forward the communications to message dispatcher 34. Message dispatcher 34 determines the appropriate application software modules 23 for processing each communication, and dispatches one or more inbound message 45A to the identified modules. In a similar manner, application software modules 23 may generate outbound messages 45B to communicate with remote devices over network 104.

Application software modules 23 may include a number of modules including product ID module 28, store ID module 22, client location module 26, intra-store location module 30, shopping list module 24, and code translation module 32. Application software modules 23 interact with database servers 42 to access a number of data stores 44, including product data 44A, availability data 44B, intra-store location data 44C, code data 44D, and shopping list state data 44E. Data stores 44 may be implemented in a number of different forms including data storage files, or as a database management system (DBMS). The database management system may be a relational (RDBMS), hierarchical (HDBMS), multidimensional (MDBMS), object oriented (ODBMS or OODBMS) or object relational (ORDBMS), or other database management system. Furthermore, although illustrated separately, data stores 44 could be combined into a single database or other data storage structure. Data stores 44 could, for example, be implemented as a single relational database (such as that marketed by Microsoft® Corporation under the trade designation 'SQL SERVER').

In general, product ID module 28 handles and/or processes identification of various products that a consumer may add to or remove from a shopping list. For instance, product ID module 28 may receive, as part of inbound messages 45A, an identification of a product (e.g., for purposes of inventory or to determine an intra-store location of the identified product). In turn, product ID module 28 may map the product identification included in inbound messages 45A to data stored as part of product data 44A. Based on the mapping, product ID module 28 may supply product information, such as a description, or an alternate product if the identified product is unavailable, via outbound messages 45B to communication servers 36. In instances where product ID module 28 identifies an alternate product, product ID module 28 may apply criteria such as product preferences and/or dietary restrictions supplied by a user, and availability of coupons or other discounted options at a particular store location. Additionally, product ID module 28 may generate alternate store suggestions where the product may be available (e.g., based on proximity to the current location of the mobile computing device)

Intra-store location module 30, in various implementations, is configured or otherwise operable to receive, update, and map intra-store locations of products to product IDs. As described with respect to FIG. 1, shopping assistant system 114 may receive intra-store location information of various products, e.g., from mobile devices 116 via network 104. In such examples, intra-store location module 30 may access and modify information that is stored as part of data stores 44, such as intra-store location data 44C. Additionally, intra-store location module 30 may map various portions of intra-store location data 44C to one or more of product data 44A and shopping list state data 44E, the latter of which is described in more detail below. In some examples, intra-store location module 30 may determine a particular product's intra-store location based on location data that is received with product ID data as part of incoming messages 45A. As noted, intra-store location module 30 may continually receive and update intra-store location data 44C using input from multiple client devices, thus crowdsourcing diverse information and providing up-to-date intra-store location information in real time.

Store ID module 22 of shopping assistant system 114 is configured or otherwise operable to receive and interpret identifications of specific stores, such as one or more of store locations 102 illustrated in FIG. 1. As one example, store ID module 22 may receive, as part of inbound messages 45A, a designation of a store at which a client device, such as mobile device 116A, is located. Based on the particular store location identified by the client device, store ID module 22 may access various information from data stores 44, such as product data 44A corresponding to the store location and, in some instances, availability data 44B pertaining to product data 44A at the identified store location.

As shown in FIG. 2, application modules 23 may also include shopping list module 24. In various implementations, shopping list module 24 is configured or otherwise operable to populate and depopulate a shopping list for a consumer (or group of consumers) based on information received from client devices via network 104. In certain specific examples, shopping list module 24 may update information included in data stores 44, such as shopping list state data 44E, in order to populate or depopulate the shopping list. For instance, shopping list module 24 may add a product identification (or alternatively, generate a reference, such as a pointer, to a product identification in product data 44A) in response to receiving a request to add a product to a shopping list. Conversely, shopping list module 24 may remove a product identification (or alternatively, delete a reference to a product identification in product data 44A) in response to receiving a request to remove an item from the shopping list. As noted, shopping list module 24 may populate and depopulate the shopping list based on requests received from diverse client devices, thereby enabling collaborative updating of shopping list information by consumers who share common purchasing needs.

Client location module 26 of shopping assistant system 114 is configured or otherwise operable to discern a location of a client device, such as mobile device 116A. In some examples, store ID module 22 may not receive an explicit designation of a particular store location at which mobile device 116A is located. In such instances, client location module 26 uses various data included in inbound messages 45A, such as GPS coordinates transmitted by mobile device 116A or SSIDs of wireless network connections accessible to mobile device 116A, to discern that mobile device 116A is at or near a particular store location. In some instances, client location module 26 may include, as part of outgoing messages 45B, a list of possible store locations that a consumer using mobile device 116A may visit (e.g., if client location module 26 detects that mobile device 116A is positioned near a mall or other shopping complex).

As shown, application modules 23 may also include code translation module 32. Code translation module 32 may receive, as part of inbound messages 45A, information pertaining to barcodes, UPCs, and other machine-readable codes. For instance, a consumer may use a camera of mobile device 116A to scan a barcode affixed to a product, and transmit the barcode (and/or related information) via network 104 to shopping assistant system 114. In turn, code translation module 32 may use code data 44D to discern a product identified by the code (e.g., using a lookup table that maps code data 44D to product data 44A). In this manner, application modules 23, such as code translation module 32, product ID module 28, and intra-store location module 30, may share collaboratively map information received via inbound messages 45A for efficient data retrieval and generation.

Figure 3:
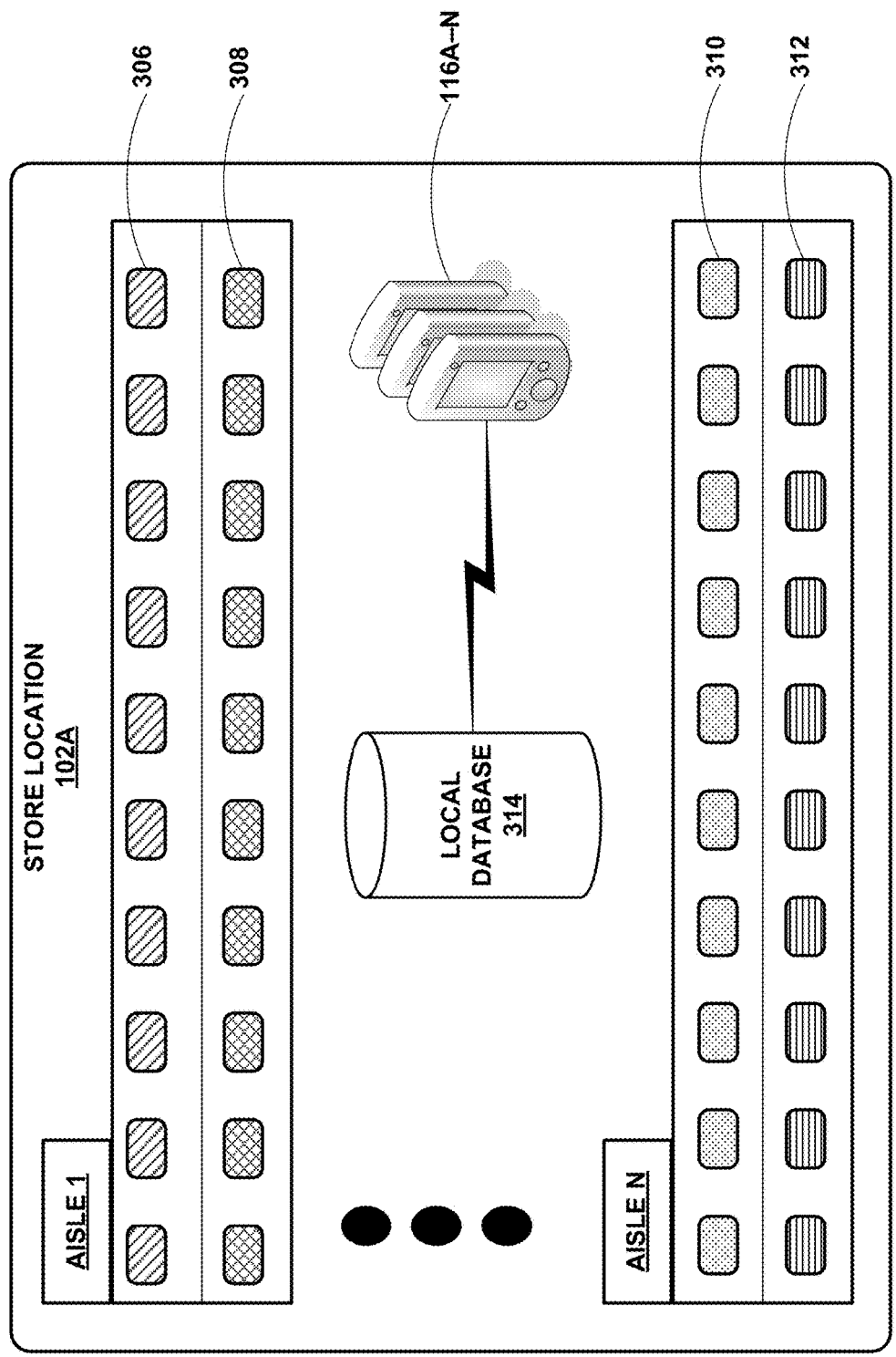
FIG. 3 is a conceptual diagram illustrating an example of a store location at which one or more of mobile devices may implement the intra-store product location techniques of this disclosure.

FIG. 3 is a conceptual diagram illustrating an example of a store location 102A at which one or more of mobile devices 116 may implement the intra-store product location techniques of this disclosure. FIG. 3 illustrates details of an example layout of store location 102A described above with respect to FIG. 1. Also, as described with respect to FIG. 1, consumers may, at various times, avail of functionalities provided by one or more of mobile devices 116 while at store location 102A. For instance, a consumer may use mobile device 116A to access an updated shopping list, and depopulate the list as the consumer collects items for purchase (e.g., by scanning a barcode affixed to the item using a camera of mobile device 116A). Additionally, one or more of mobile devices 116 may enable a user to access shopping list information stored remotely (e.g., at server 110 of FIG. 1). For instance, mobile devices 116 may provide a user with access to the location of a particular product within store location 102A. By providing a user with intra-store locations of various products included in the shopping list, mobile devices 116 may increase efficiency (e.g., by reducing any time the user would spend looking for the product, or time that the user would spend in traveling to another of store locations 102 if the user fails to locate the product on his/her own at store location 102A).

As shown in FIG. 3, store location 102A may include several aisles 1-N (hereinafter, "aisles"). Additionally, a party, such as a retail chain that operates store location 102A, may arrange various products according to the aisles. In the example of FIG. 3, first item 306 and second item 308 are placed in a top shelf and a bottom shelf, respectively, of aisle 1. Similarly, third item 310 and fourth item 312 are placed in a top shelf and a bottom shelf, respectively, of aisle N. While FIG. 3 illustrates two shelves per aisle, with a single item placed on each shelf for ease of illustration purposes only, it will be appreciated that a store location may include aisles with any number of shelves, and various products may be placed on a given shelf.

In some scenarios, a consumer using mobile device 116A may enter store location 102A. Upon entering store location 102A, the consumer may use mobile device 116A to access a shopping list that includes various items, such as first item 306 and third item 310. Based on information collected previously (e.g., via mobile devices used by consumers who previously visited store location 102A), the shopping assistant system may provide, via the shopping list, information associated with third item 310, such as the intra-store location of item 310.

For instance, the shopping assistant system may determine that mobile device 116A is at or near store location 102A (e.g., based on GPS coordinates transmitted by mobile device 116A, by triangulating the location of mobile device 116A using cellular communication towers and/or wireless access points, by detecting one or more SSIDs identified by mobile device 116A, etc.). Upon detecting that mobile device 116A is at or near store location 102A, the shopping assistant system may provide, via the shopping list, information pertaining to the availability and/or intra-store location of third item 310 at store location 102A. In the particular example illustrated in FIG. 3, the shopping assistant system may indicate, via the shopping list, that third item 310 is available at store location 102A, and that third item 310 is located in the top shelf of aisle N.

In contrast, the shopping assistant system may not have any information pertaining to the availability or intra-store location of first item 306 at store location 102A. In this instance, the consumer using mobile device 116A may, on his/her own, locate first item 306, and remove first item 306 from the shopping list (e.g., by scanning a barcode affixed to first item 306 using mobile device 116A or by providing a user input at mobile device 116A to remove first item 306 from the shopping list). Based on the removal of first item 306 from the shopping list while mobile device 116A is at store location 102A, the shopping assistant system may determine that first item 306 is available at store location 102A, and update the availability information pertaining to first item 306A accordingly. In turn, the shopping assistant system may provide the availability information to consumers who subsequently visit store location 102A, such as a user of mobile device 116B. In this manner, the shopping assistant system may implement the techniques of this disclosure to collect and disseminate product-related information to consumers using mobile devices 116 at various times, effectively crowdsourcing the product-related information.

In the example described, the shopping assistant system may not obtain intra-store location information for first item 306. The intra-store location of first item 306 may be absent from the transmitted information for various reasons, such as an inability of mobile device 116A to discern the intra-store location (e.g., due to a lack of GPS connectivity), or the consumer's choice not to provide the intra-store location via user input. In this example, the shopping assistant system may, via the shopping list, inform the user of mobile device 116B that first item 306 is available at store location 102A. However, the shopping assistant system may not provide any supplemental information, such as the intra-store location of first item 306, via the shopping list to the user of mobile device 116B. In various implementations, mobile device 116B may receive availability information including data that indicates a previous (e.g., a last-known, last-reported, or last-recorded) intra-store location of the product.

Upon locating first item 306 within store location 102A, the user of mobile device 116B may remove first item 306 from the shopping list, such as by using mobile device 116B to scan a barcode affixed to first item 306. In this example, mobile device 116B may identify or approximate the location of first item 306 (e.g., using GPS coordinates or by triangulating the location using wireless access points deployed at store location 102A), and determine that first item 306 is located at aisle 1 within store location 120A. In turn, client-side software executing on mobile device 116B may transmit the intra-store location of first item 306 (namely, aisle 1) to the shopping assistant system. In this example, mobile device 116B may transmit the aisle number but no further intra-store location information, such as a shelf number associated with first item 306, to the shopping assistant system.

At a subsequent time, a consumer using mobile device 116C for shopping list purposes may enter store location 102A. Additionally, the current shopping list for the user of mobile device 116C may include first item 306. In this example, mobile device 116C may display, via a client-side shopping list application, availability and intra-store location information pertaining to first item 306. More specifically, in this instance, the shopping assistant system may indicate, via the shopping list application executing on mobile device 116C, that first item 306 is available at store location 102A, and that first item 306 is located in aisle 1.

However, in this instance, the shopping assistant system may not provide any additional information, such as a shelf number associated with first item 306, to the user of mobile device 116C. In turn, the user of mobile device 116C, upon locating first item 306 within aisle 1, may provide additional information, such as the location of first item 306 in the top shelf of aisle 1, to the shopping assistant system via mobile device 116C. As a result, future consumers (e.g., who use one or more of mobile devices 116) who visit store location 102A and use the shopping assistant system for shopping list purposes, may have access to the aisle and shelf number of first item 306 within store location 102A. In this manner, the shopping assistant system may implement the techniques of this disclosure to crowdsource (e.g., collect and dynamically supplement) product-related information to benefit subsequent consumers at a given store location.

While the example described above illustrates the implementation of the crowdsourcing techniques of this disclosure with respect to a single iteration of adding product-related information, it will be appreciated that the techniques may also be implemented to modify and/or update product-related information. For example, if a retail chain or other party operating store location 102A relocates a product, such as first item 306, to a different aisle and/or shelf, the shopping assistant system may collect and update the intra-store location information for first item 306 (e.g., via automatic detection and transmission by mobile devices 116 or user input entered at mobile devices 116). In examples, the shopping assistant system may utilize date- and/or time-stamps in determining which information is current, thus providing up-to-date product-related information to users of mobile devices 116 in real time. For instance, the shopping assistant system may execute one or more algorithms that use date- and/or time-stamps as parameters. The executed algorithm(s) may employ one or both of voting-based and authority-based techniques, which in turn may weight particular data based on reliability scores associated with particular users, take into account recent tendencies in location reporting, cross-check incoming data for statistical consistency, etc.

As illustrated in FIG. 3, in some examples, a store location may include a local database that may store product location information. For instance, store location 102A includes local database 314. Mobile devices 116 may communicate with local database 314 through a variety of channels (e.g., using a wireless access point or other communication medium deployed at store location 102A). Local database 314 may serve as an alternative and/or a supplement to remote devices (such as server 110 of FIG. 1) that implement the shopping assistant system techniques described herein. By storing product location information at (and making the product location information available through) local database 314, an administrator of store location 102 may provide potential advantages, such as backing up store product location information in case of a data loss at the remote device, and providing the information via a faster and/or more dependable connection (e.g., WiFi® as opposed to cellular data services). In various implementations, local database 314 may include product IDs and intra-store locations of products available at store location 102A and/or at other store locations (e.g., at other stores operated by the same company as store location 102). Functionalities described herein with respect to shopping assistant systems may be provided by one or more of local database 314 and various remote devices, either singly or in any combination.

Figure 4:
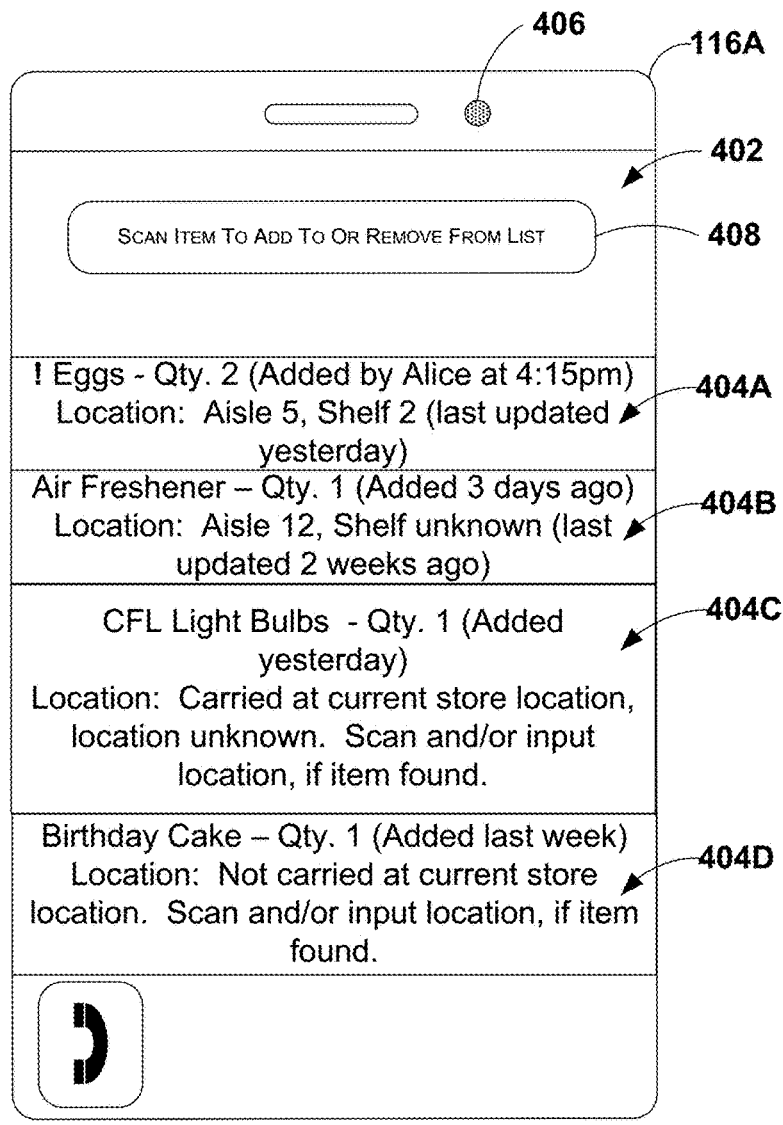
FIG. 4 is a conceptual diagram illustrating details of a graphical user interface (GUI) provided at a mobile device described with respect to FIGS. 1 & 3.

FIG. 4 is a conceptual diagram illustrating details of a graphical user interface (GUI) 400 provided at mobile device 116A described with respect to FIGS. 1 & 3. GUI 402 includes GUI elements such as scan button 408 and item indicators 404A-404D (item indicators 404). Additionally, FIG. 4 illustrates camera lens 406, which may serve as an interface to a camera (e.g., a front-facing camera) of mobile device 116A. In various examples, GUI 402 may be generated for display by client-side software executing on mobile device 116A that implements one or more shopping assistance techniques of this disclosure.

As shown in FIG. 4, the shopping assistant system that supplies shopping list information to mobile device 116A may have access and/or provide varying levels of information pertaining to different items. As some specific examples, item indicators 404 display varying levels of information pertaining to the availability and/or intra-store locations of various items at a given store location (e.g., store location 102A described with respect to FIGS. 1 & 3).

Item indicator 404A includes an exclamation mark ("!") to indicate a shopping list addition that a user of mobile device 116A has not yet viewed, or is viewing for the first time since opening the current instance of the shopping assistant client software on mobile device 116A. Additionally, item indicator 404A includes a notification that the item was added by "Alice" at 4:15 pm of the current day. For purposes of example, Alice may be a user of a computing device positioned remotely from mobile device 116A, such as computing device 124 positioned at home location 106 in FIG. 1. Item indicator 404A illustrates the real-time updating and cloud-based syncing of shopping list information carried out when implementing one or more techniques of this disclosure. Additionally, item indicator 404A includes the intra-store location of the item, including both the aisle and shelf number.

In contrast, item indicators 404B-404D do not include the exclamation mark to indicate that the user of mobile device 116A has not yet viewed them. Additionally, item indicator 404B includes partial intra-store location information, namely, the aisle number of the item. However, item indicator 404B includes a notification that the shopping assistant system does not currently have access to the shelf number associated with the respective item. Based on the partial intra-store location information included in item indicator 404B, a consumer may infer availability information of the item (specifically, that the item is available) at the current store location.

Item indicator 404C includes availability information of an item, but does not include any intra-store location information pertaining to the item at the current store location. As the shopping assistant system does not currently provide any intra-store location information for the item, the shopping assistant system (through server software, client software, etc.) causes item indicator 404C to explicitly notify a user that the item is available at the current store location. In contrast, item indicator 404D includes a notification that the shopping assistant system has neither availability nor intra-store location information pertaining to the respective item at the current store location.

As shown, both of item indicators 404C & 404D include a request for the user to scan and/or input a location of the respective items, if the user locates the items at the current store location. In one example, the user may actuate scan button 408 and scan a barcode affixed to a located item by placing the barcode in the line of sight of camera lens 406. In various implementations, the client-side software of the shopping assistant system may modify GUI 402 to present the user with one or more options, such as options to add the scanned item to the shopping list, to remove the scanned item from the shopping list, or to scan additional instances of the item in response to a greater requested quantity of the item.

Additionally, the shopping assistant system may determine or approximate the intra-store location of the item (e.g., using one or more techniques enumerated above) and/or prompt the user to provide the intra-store location information via user input via GUI 402. Based on data received via these techniques, the shopping assistant system may record and/or update the intra-store location information for each item. Additionally, the shopping assistant system may record a timestamp associated with each update of the intra-store location. As shown in FIG. 4, the shopping assistant system may display timestamp-related information via GUI 402 (e.g., item indicator 404B indicates that the availability and/or intra-store location information of the item was last updated two weeks prior to a current date).

Figure 5:
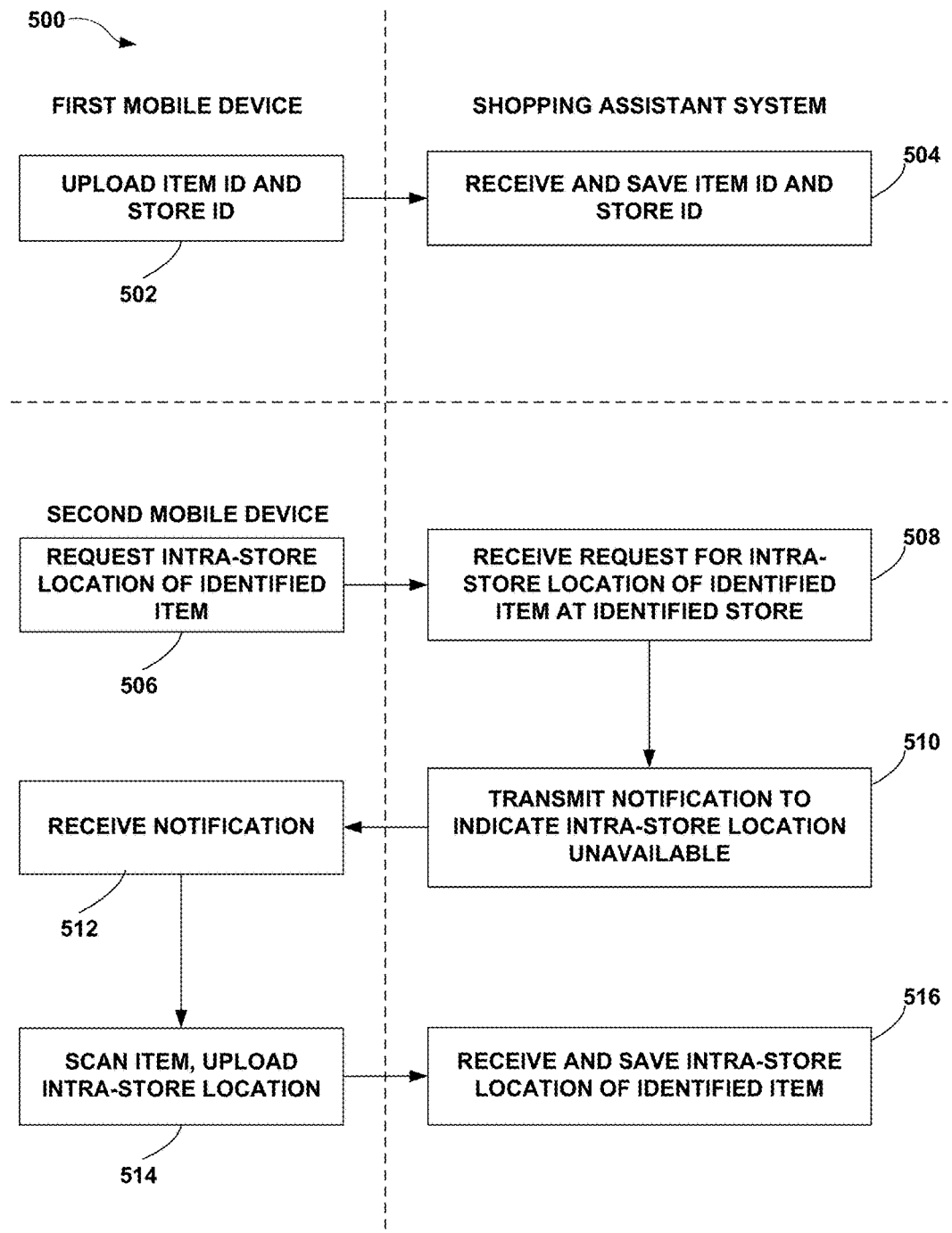
FIG. 5 is a flowchart illustrating an example process by which a shopping assistant system may, in conjunction with multiple client devices, implement one or more crowdsourcing techniques of this disclosure.

FIG. 5 is a flowchart illustrating an example process 500 by which a shopping assistant system may, in conjunction with multiple client devices, implement one or more crowd-sourcing techniques of this disclosure. Although process 500 may be performed by any device or combination of devices described herein, for purposes of clarity only, process 500 is described herein with respect to shopping assistant system 114 (implemented on server 110) and mobile devices 116 of FIG. 1.

Process 500 may begin when mobile device 116A uploads an item ID and a store ID to server 110 (502). While illustrated as a single step for ease of illustration purposes only, it will be appreciated that mobile device 116A may upload an item ID and a store ID at different times. Additionally, mobile device 116A may upload more than one item ID for a given store ID, e.g., in instances where a consumer using mobile device 116A scans more than one item at store location 102A, on one or more visits to store location 102A. It will also be appreciated that mobile device 116A may upload the store ID of store location 102A by active and/or passive means.

One example of actively uploading the store ID includes receiving, at a user interface such as GUI 402 provided at mobile device 116A, a user input that indicates that mobile device 116A is at store location 102A. In this example, mobile device 116A may upload, to server 110, the store ID of store location 102A based on the received user input. In contrast, an example of passively uploading the store ID may include periodically or constantly transmitting, by mobile device 116A, one or more of GPS coordinates or SSIDs associated with mobile device 116A. As further examples of passively uploading the store ID, shopping assistant system 114 and/or other components of server 110 may periodically poll the location of mobile device 116A, such as by triangulating the location of mobile device 116A using cellular communication towers in the vicinity of mobile device 116A.

Shopping assistant system 114 may receive and save the item ID and the store ID uploaded by mobile device 116A (504). As one example, shopping assistant system 114 may not receive any intra-store product location information pertaining to the identified item at store location 102A. In this instance, shopping assistant system 114 may save availability information associated with the identified item at store location 102A (e.g., that the identified item is available at store location 102A).

At another time, such as subsequently to a consumer using mobile device 116A visiting store location 102A, a consumer using mobile device 116B may enter store location 102A. Additionally, a shopping list created and/or accessed by the consumer may include the item identified earlier by mobile device 116A. Using mobile device 116B, the consumer may request, from shopping assistant system 114, the intra-store product location of the identified item within store location 102A (506).

As described above with respect to the upload of the store ID by mobile device 116A, mobile device 116B may request the intra-store product location of the identified item by active and/or passive means. As an example of a passive request, mobile device 116B may request the intra-store product location by virtue of the identified item being included in the shopping list accessed by mobile device 116B. In turn, shopping assistant system 114 may receive, from mobile device 116B, the request for the intra-store product location of the identified item (508) and transmit, to mobile device 116B, a notification indicating that the intra-store product location of the identified item is currently unavailable to shopping assistant system 114 (510).

Mobile device 116B may receive the notification from shopping assistant system 114 indicating that the intra-store product location of the identified item is currently unavailable through shopping assistant system 114 (512). At this point, the consumer using mobile device 116B may have access to information regarding the availability of the identified item at store location 102A (e.g., based on the availability information uploaded from mobile device 116A to shopping assistant system 114 in 502). In response, the consumer, upon locating the identified item at store location 102A, may use mobile device 116B to scan a barcode and/or UPC affixed to the identified item, and upload the intra-store product location of the identified item (514). As described, the consumer using mobile device 116B may either enter the intra-store product location of the identified item, or mobile device 116B may automatically approximate the intra-store product location before uploading to shopping assistant system 114.

In turn, shopping assistant system 114 may receive and save the intra-store product location information for the identified item (516). In the specific example described with respect to process 500, shopping assistant system 114 receives identifications of an item and a store, as well as availability information for the item at the store, from mobile device 116A. At a subsequent time, shopping assistant system 114 supplies the availability information to mobile device 116B. Responsive to a request from mobile device 116B for the intra-store product location of the identified item at the store, shopping assistant system 114 notifies mobile device 116B that the intra-store product location is currently unavailable.

In response to the received notification mobile device 116B (either through user input or through automatic response), uploads intra-store product location information for the identified item within the identified store location. In turn, shopping assistant system 114 supplements the availability information for the identified item with the received intra-store product location information.

The example of process 500 illustrates a shopping assistant system may implement the techniques of this disclosure to crowdsource information gathered from various client devices over time to provide robust product-related information to subsequent consumers. When implemented iteratively over time, the shopping assistant system may continually update and fine-tune the information based on the most recent available information. In this manner, techniques of this disclosure may enable a shopping assistant system to use crowdsourcing to generate and distribute more complete, robust, and up-to-date product-related information to multiple consumers, thereby assisting the users to more easily and efficiently purchase the items.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. Additional examples of computer readable medium include computer-readable storage devices, computer-readable memory, and tangible computer-readable medium. In some examples, an article of manufacture may comprise one or more computer-readable storage media.

In some examples, computer-readable storage media and/or computer-readable storage devices may comprise non-transitory media and/or non-transitory devices. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method, comprising:
   receiving, at a crowd-sourced database associated with a plurality of stores, at least one of: a first request to add a product to a shopping list; or an intra-store product location indicating a location of a product within a store, from a first client device to update the crowd-sourced database, wherein the crowd-source database comprises information about a plurality of products including the product, a plurality of shopping lists including the shopping list, the plurality of stores including the store, and wherein the first client device is one of a plurality of client devices;
   receiving, at the crowd-sourced database, a second request to access the shopping list from a second client device from amongst the plurality of client devices to access the shopping list; and
   sending, by the crowd-sourced database, in response to detection of the second device being within a proximity of the store location and the second request received from the second client device, an updated version of the shopping list to the second device, the shopping list having been updated based on the first request by the first client device;
   wherein the updated version of the shopping list comprises: an identifying information for the product and the intra-store product location, and
   wherein the identifying information for the product and the intra-store product location are associated with each another in the updated version of the shopping list.

2. The method of claim 1, wherein detecting, by the crowd-sourced database, that the second client device is in the proximity to the store location comprises:
   receiving, from the second client device, one or more location coordinates associated with the second client device; and
   comparing the location coordinates associated with the second client device to one or more location coordinates associated with the store.

3. The method of claim 1, wherein detecting, by the crowd-sourced database, that the second client device is in the proximity to the store location comprises:

triangulating a position of the second client device; and comparing the triangulated position of the second client device to one or more location coordinates associated with the store.

4. The method of claim 1, further comprising storing, at the crowd-sourced database, the first request to add the product to the shopping list in at least one storage device.

5. The method of claim 1, further comprising storing, at the crowd-sourced database, the intra-store product location indicating the location of the product within the store in at least one storage device.

6. The method of claim 1, further comprising receiving at the crowd-sourced database, subsequent to sending identifying information for a product and an intra-store product location to the second client device, an updated intra-store product location associated with the product, the updated intra-store product location being different from the intra-store product location and stores, in at least one storage device, the updated intra-store product location in place of the intra-store product location.

7. The method of claim 6, further comprising receiving, at the crowd-sourced database, a third request associated with the product from a third client device and sends the updated intra-store product location to the third client device.

8. The method of claim 7, further comprising receiving, at the crowd-sourced database, a fourth request to add the product to a shopping list from the third client device.

9. The method of claim 8, wherein the fourth request associated with the product comprises a machine-readable code associated with the product.

10. A method, comprising:
receiving, at a crowd-sourced database associated with a plurality of stores, at least one of: a first request to add a product to a shopping list; or an intra-store product location indicating a location of a product within a store, from a first client device to update the crowd-sourced database, wherein the crowd-source database comprises information about a plurality of products including the product, a plurality of shopping lists including the shopping list, the plurality of stores including the store, and wherein the first client device is one of a plurality of client devices;

receiving, at the crowd-sourced database, a second request to access the shopping list from a second client device from amongst the plurality of client devices to access the shopping list;

sending, by the crowd-sourced database in response to detection of the second device being within a proximity of the store location and the second request received from the second client device, an updated version of the shopping list to the second device from the crowd-sourced database, the shopping list having been updated based on the first request by the first client device;

wherein the updated version of the shopping list comprises: an identifying information for the product and the intra-store product location and wherein the identifying information for the product and the intra-store product location are associated with each another in the updated version of the shopping list; and receiving, at the crowd-sourced database, subsequent to receiving the updated version of the shopping list with the second client device, an updated intra-store product location associated with the product from the second client device, the updated intra-store product location being different from the intra-store product location.

11. The method of claim 10, wherein detecting, by the crowd-sourced database, that the second client device is in proximity to the store location comprises:

receiving, from the second client device, one or more location coordinates associated with the second client device; and comparing the location coordinates associated with the second client device to one or more location coordinates associated with the store.

12. The method of claim 10, wherein detecting, by the crowd-sourced database, that the second client device is in proximity to the store location comprises:

triangulating a position of the second client device; and comparing the triangulated position of the second client device to one or more location coordinates associated with the store.

13. The method of claim 10, further comprising storing, at the crowd-sourced database, the first request to add the product to the shopping list in at least one storage device.

14. The method of claim 10, further comprising storing, at the crowd-sourced database, the intra-store product location indicating the location of the product within the store in at least one storage device.

15. The method of claim 10, further comprising receiving at the crowd-sourced database, subsequent to sending identifying information for a product and an intra-store product location to the second client device, an updated intra-store product location associated with the product, the updated intra-store product location being different from the intra-store product location and stores, in at least one storage device, the updated intra-store product location in place of the intra-store product location.

16. The method of claim 15, further comprising receiving, at the crowd-sourced database, a third request associated with the product from a third client device and sends the updated intra-store product location to the third client device.

17. The method of claim 16, further comprising receiving, at the crowd-sourced database, a fourth request to add the product to a shopping list from the third client device.

18. The method of claim 17, wherein the fourth request associated with the product comprises a machine-readable code associated with the product.

* * * * *